(12) United States Patent
Widener

(10) Patent No.: US 6,536,392 B2
(45) Date of Patent: Mar. 25, 2003

(54) METHOD AND APPARATUS FOR STARTING AN INTERNAL COMBUSTION ENGINE

(75) Inventor: Stanley K. Widener, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/829,882

(22) Filed: Apr. 11, 2001

(65) Prior Publication Data

US 2002/0148425 A1 Oct. 17, 2002

(51) Int. Cl.[7] ................................................. F02N 9/00
(52) U.S. Cl. ................................................. 123/179.19
(58) Field of Search ........................ 123/179.19, 179.18

(56) References Cited

U.S. PATENT DOCUMENTS 5,456,240 A * 10/1995 Kanesaka .................... 123/565

* cited by examiner

Primary Examiner—Gene Mancene
Assistant Examiner—Arnold Castro
(74) Attorney, Agent, or Firm—Oliff & Berridge, PLC.

(57) ABSTRACT

A method for starting a primary engine using an exhaust gas stream from an auxiliary engine includes the steps of conducting the exhaust gas stream from the auxiliary engine to an air induction system of the primary engine, adding fresh air to the exhaust stream, and reducing the pressure of the exhaust stream before it arrives at the air induction system.

An apparatus for starting a primary engine using an exhaust gas stream from an auxiliary engine includes a means for conducting the exhaust gas stream from the auxiliary engine to an air induction system of the primary engine, a means for adding fresh air to the exhaust gas stream before the stream arrives at the air induction system, and a means for reducing the exhaust gas stream pressure to prevent back pressuring of the exhaust system of the auxiliary engine, or over-pressurizing the air induction system of the primary engine. The means for conducting the exhaust gas stream from the auxiliary engine to the air induction system is typically a conduit, such as a system of piping, or manifolds. The means for adding fresh air to the exhaust gas stream, as well as the means for reducing the exhaust stream pressure, is typically a check valve.

The invention also includes a system for starting a primary engine which includes an auxiliary engine and a conduit in fluid communication with an exhaust gas stream of the auxiliary engine and an air induction system of the primary engine. The system also includes a check valve in fluid communication with the conduit.

17 Claims, 1 Drawing Sheet

METHOD AND APPARATUS FOR STARTING AN INTERNAL COMBUSTION ENGINE

BACKGROUND OF THE INVENTION

1. Technical Field

This invention relates generally to auxiliary methods and apparatus for starting internal combustion engines. More particularly, the invention relates to a method and apparatus for starting such engines which adapts to the intake requirements of a low-compression-ratio compression ignition engine.

2. History of Related Art

Starting internal combustion engines of the compression ignition type is generally accomplished by means of a cranking motor, the main shaft of which is coupled to the engine crankshaft by an automatic clutch. The cranking motor is typically an electric or compressed air motor. In some cases, however, the added weight and/or complexity of a cranking motor may not be tolerable. Extra weight is especially critical for Unmanned Aerial Vehicles (UAVs), which make use of small, lightweight primary engines. If a diesel engine is used in such an application, it is usually of the low-compression type (to save weight), which runs well when warm, but is notoriously hard to start.

It is known to eliminate the disadvantages of the conventional starting device by connecting a direct current motor to an air motor in the same axial line, with an air pressure source obtained using a compressor driven by the engine, such as a supercharger. However, this solution also does not address those applications which do not tolerate the weight of a compressor in addition to that of the engine.

When mechanical complexity or weight is a consideration, it is also known to use external, auxiliary internal combustion engines for starting purposes. Such methods typically involve an auxiliary motor connected in some mechanical fashion to the primary motor during starting operations, perhaps using a transmission. While this method may be highly inconvenient in most instances, such as for diesel trucks, it is useful in those cases which lend themselves to the use of auxiliary, or offboard equipment for starting operations. It is also known to introduce exhaust gases from an auxiliary engine, via heat exchanger, into the induction system of the primary engine. However, such methods still fail to completely address the difficulty of starting a low-compression engine, which may demand extra fresh air, or suffer from over-pressure due to excess exhaust gas.

Therefore, what is needed, is a method and apparatus suited to starting a lightweight, low-compression, internal combustion engine. The method and apparatus should make use of conventional components wherever possible, and should be inexpensive. The method and apparatus should adapt to the need for extra fresh air, or less exhaust volume/pressure from an auxiliary engine. Finally, the method and apparatus should add little, if any, weight and mechanical complexity to existing low-compression engines used in weight-sensitive applications, such as for UAVs.

SUMMARY OF THE INVENTION

The invention includes a method for starting a primary engine using the exhaust gas stream from an auxiliary engine, which is usually a diesel engine. The method includes the steps of conducting the exhaust gas stream from the auxiliary engine to the air induction system of the primary engine, adding fresh air to the exhaust stream, and reducing the pressure of the exhaust stream before it arrives at the air induction system.

Conducting the exhaust stream from the auxiliary engine to the air induction system of the primary engine is typically accomplished using a conduit, such as an exhaust manifold, or some other system of piping. Adding fresh air and reducing the pressure of the exhaust stream before the exhaust gas stream arrives at the air induction system is typically accomplished using a check valve in line with the conduit. The pressure of the exhaust stream is typically reduced by diverting a portion of the exhaust stream away from the air induction system. Thus, the check valve typically has an inlet in fluid communication with the fresh air, and an outlet for diverting a portion of the exhaust stream away from the air induction system. The method may also include the steps of starting the auxiliary engine and idling the auxiliary engine, to enhance the oxygen content of the stream, and increase the presence of active radical species that may enhance ignition for the primary engine.

The invention also includes an apparatus for starting a primary engine using the exhaust gas stream from an auxiliary engine, which includes a means for conducting the exhaust gas stream from the auxiliary engine to the air induction system of the primary engine, a means for adding fresh air to the exhaust gas stream before the stream arrives at the induction system, and the means for reducing the exhaust gas stream pressure to prevent back pressuring of the exhaust system of the auxiliary engine.

The means for conducting the exhaust gas stream from the auxiliary engine to the air induction system is typically a conduit, such as a system of piping, or manifolds. The means for adding fresh air to the exhaust gas stream, as well as the means for reducing the exhaust stream pressure, is typically a check valve.

The invention also includes a system for starting a primary engine which includes an auxiliary engine and the conduit. The conduit is in fluid communication with the exhaust gas stream of the auxiliary engine and the air induction system of the primary engine. The system also includes a check valve in fluid communication with the conduit.

Preferably, the auxiliary engine is a diesel engine. The check valve operates to admit fresh air and the exhaust stream, and to divert a portion of the exhaust stream away from the air induction system. As mentioned above, the exhaust stream typically includes active radical species, and has an idling oxygen content which is greater than the operating oxygen content.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
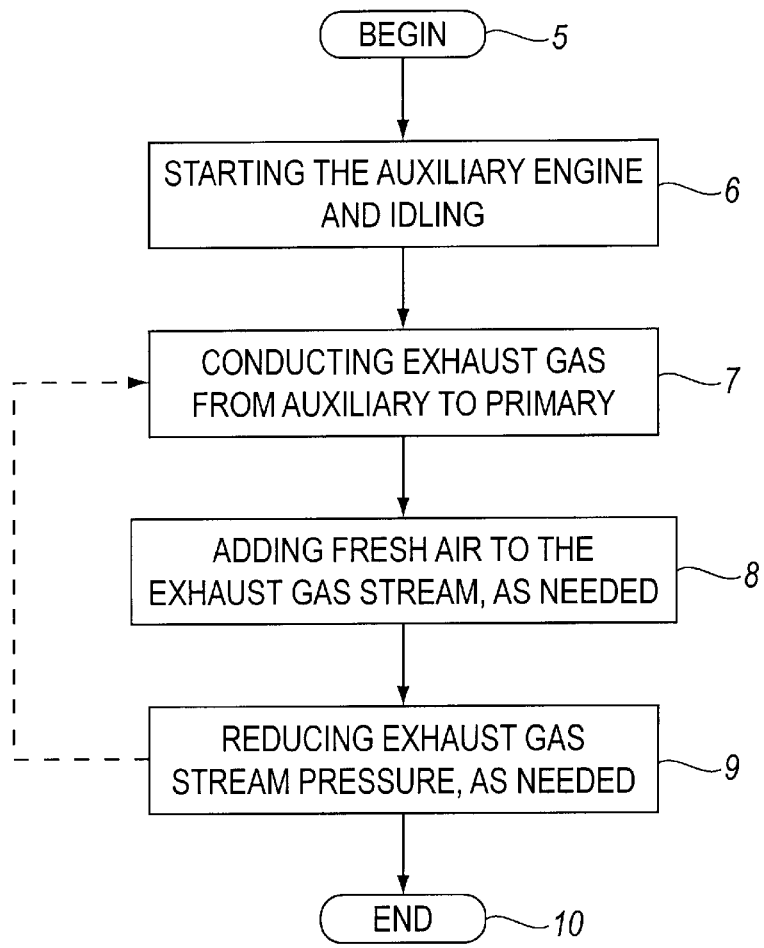
FIG. 1 is a flowchart diagram which illustrates a method for starting a primary engine in accordance with a preferred embodiment of the present invention.

Turning now to FIG. 1, a flowchart diagram which illustrates a preferred embodiment of a method for starting an engine, especially a low-compression diesel engine, can be seen. The method begins at step 5 and continues with starting the auxiliary engine (which will be used to start the primary engine) and allowing it to idle in step 6. The auxiliary engine is preferably a diesel engine and idling the auxiliary engine enhances the oxygen content of the exhaust stream and increases the presence of active radical species that may enhance ignition for the primary engine.

The exhaust gas stream produced by the auxiliary engine is then conducted from the auxiliary engine to the air induction system of the primary engine in step 7. As needed by the primary engine, and particularly after starting the primary engine, fresh air is added to the exhaust stream to accommodate demands of the primary engine. This occurs in step 8. To avoid back pressuring the exhaust system of the auxiliary engine or over-pressurizing the air induction system of the primary engine, the pressure of the exhaust stream is relieved before it arrives at the air induction system in step 9. Step 8 occurs when the air demand of the primary engine exceeds the exhaust gas flow of the auxiliary engine. Step 9 occurs when the exhaust gas flow of the auxiliary engine exceeds the air demand of the primary engine. The method ends at step 10, or continues by repeating steps 7–9.

Conducting the exhaust stream from the auxiliary engine to the air induction system is typically accomplished using a conduit, such as an exhaust manifold, an intake manifold, some combination of these, or some other system of piping. Adding fresh air and reducing pressure in the exhaust stream is typically accomplished using a check valve or a plurality of check valves in line with the conduit. The pressure of the exhaust stream is typically reduced by diverting a portion of the exhaust stream away from the air induction system. Thus, the check valve typically has an inlet in fluid communication with fresh air, and an outlet for diverting a portion of the exhaust stream away from the air induction system.

Figure 2:
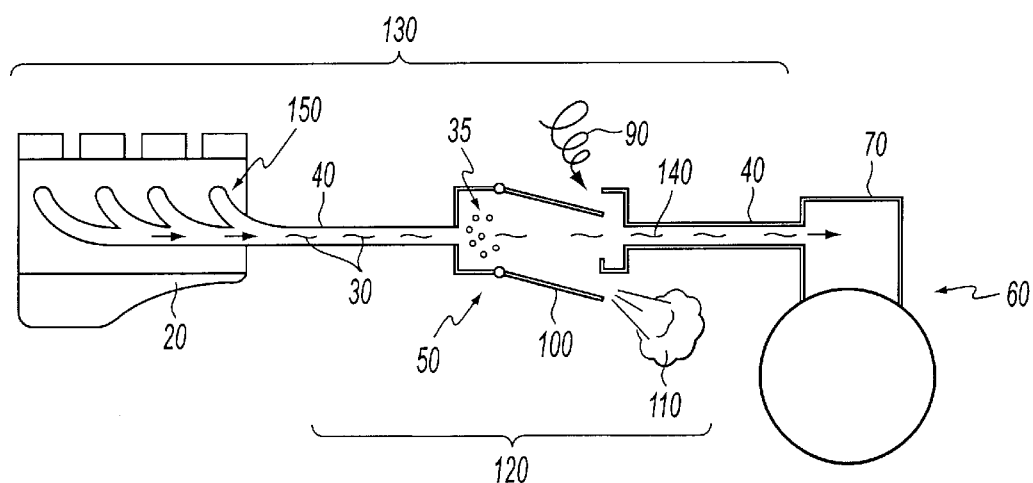
FIG. 2 is a schematic block diagram of a starting apparatus and system for starting a primary engine in accordance with a preferred embodiment of the present invention.

Turning now to FIG. 2, it can be seen that the invention also includes an apparatus 120 for starting a primary engine 60 using the exhaust gas stream 30 from an auxiliary engine 20, which includes a means 40 for conducting the exhaust gas stream 30 from the auxiliary engine 20 to an air induction system 70 of the primary engine 60, a means 50 for adding fresh air 90 to the exhaust gas stream 30 to produce a mixed stream 140 of exhaust gas 30 and fresh air 90 before the stream 140 arrives at the induction system 70, and a means 50 for reducing the exhaust gas stream 30 pressure to prevent back pressuring of the exhaust system 150 of the auxiliary engine 20.

The means 40 for conducting the exhaust gas stream 30 from the auxiliary engine 20 to the air induction system 70 is typically a conduit 40, such as a system of piping 40, or manifold 40. The means 50 for adding fresh air 90 to the exhaust gas stream 30, as well as the means 50 for reducing the exhaust stream 30 pressure is typically a check valve 50.

The invention also includes a system 130 for starting a primary engine 60 which includes the auxiliary engine 20 and the conduit 40. The conduit 40 is in fluid communication with the exhaust gas stream 30 of the auxiliary engine 20 and the air induction system 70 of the primary engine 60. The system 130 also includes the check valve 50 in fluid communication with the conduit 40.

Preferably, the auxiliary engine 20 is a diesel engine. The check valve 50 operates to admit fresh air 90, using an inlet 80, into the exhaust stream. The valve 50 also operates to divert a portion of the exhaust stream 30 away from the air induction system 70, to prevent back pressuring the exhaust induction system 150, of the auxiliary engine 20, using an outlet 100. Said diversion of exhaust stream 30 also serves to prevent over-pressurizing the air induction system 70 of the primary engine 60. As mentioned above, the exhaust stream 30 typically includes active radical species 35, and has an idling oxygen content which is greater than the operating oxygen content of the auxiliary engine 20 (i.e., it is "oxygen-rich").

The method, apparatus, and system of the present invention are especially suited to starting a lightweight, low-compression engine, such as a diesel engine used to power an UAV. Conventional, inexpensive components are used. The method, apparatus, and system are also able to adapt to the need for extra fresh air, or less exhaust volume/pressure from an auxiliary engine used to start a primary engine, and add no-weight or mechanical complexity to the existing primary engine. The apparatus may be embodied as auxiliary equipment only attached to the primary engine for starting.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method for starting a primary engine including an air induction system using an exhaust gas stream from an auxiliary engine and a check valve, comprising the step of:

conducting the exhaust gas stream from the auxiliary engine to the air induction system of the primary engine;

adding fresh air to the exhaust gas stream before the exhaust gas stream arrives at the air induction system as needed to prevent under-pressurizing the air induction system of the primary engine; and reducing the exhaust gas stream pressure before the exhaust gas stream arrives at the air induction system of the primary engine as needed to prevent over-pressuring the air induction system of the primary engine, wherein the step of adding fresh air to the exhaust gas stream before the exhaust gas stream arrives at the air induction system is accomplished using a check valve in line with a conduit conducting the exhaust gas stream from the auxiliary engine to the air induction system.

2. The method of claim 1, wherein the step of conducting the exhaust gas stream from the auxiliary engine to the air induction system of the primary engine is accomplished using a conduit.

3. The method of claim 1, wherein the check valve has an inlet in fluid communication with the fresh air.

4. The method of claim 1, wherein the step of reducing the exhaust gas stream pressure before the exhaust gas stream arrives at the air induction system of the primary engine is accomplished using a check valve in line with a conduit conducting the exhaust gas stream from the auxiliary engine to the air induction system.

5. The method of claim 1, wherein the check valve reduces the exhaust stream pressure by diverting a portion of the exhaust gas stream away from the air induction system.

6. The method of claim 1, further including the steps of:
starting the auxiliary engine; and
idling the auxiliary engine.

7. The method of claim 1, wherein the step of adding fresh air to the exhaust gas stream before the exhaust gas stream arrives at the air induction system occurs after the primary engine is started.

8. An apparatus for starting a primary engine including an air induction system using an exhaust gas stream from an auxiliary engine and a check valve, comprising:
- a means for conducting the exhaust gas stream from the auxiliary engine to the air induction system of the primary engine;
- a means for adding fresh air to the exhaust gas stream before the exhaust gas stream arrives that the air induction system; and
- a means for reducing the exhaust gas stream pressure before the exhaust gas stream arrives at the air induction system of the primary engine wherein,
  - the means for adding fresh air to the exhaust gas stream before the exhaust gas stream arrives at the air induction system is a check valve.

9. The apparatus of claim 8, wherein the means for conducting the exhaust gas stream from the auxiliary engine to the air induction system of the primary engine is a conduit.

10. The apparatus of claim 8, wherein the means for reducing the exhaust gas stream pressure before the exhaust gas stream arrives at the air induction system of the primary engine is a check valve.

11. The apparatus of claim 8, wherein the means for adding fresh air to the exhaust gas stream before the exhaust gas stream arrives at the air induction system is a check valve, and wherein the means for reducing the exhaust gas stream pressure before the exhaust gas stream arrives at the air induction system of the primary engine is a check valve.

12. A system for starting a primary engine including an air induction system, comprising:
- an auxiliary engine having an exhaust gas stream;
- a conduit in fluid communication with the exhaust gas stream and the air induction system; and
- a check valve in fluid communication with the conduit.

13. The system of claim 12, wherein the auxiliary engine is a diesel engine.

14. The system of claim 12, wherein the check valve admits fresh air into the exhaust stream.

15. The system of claim 12, wherein the check valve diverts a portion of the exhaust stream away from the air induction system.

16. The system of claim 12, wherein the exhaust stream includes active radical species.

17. The system of claim 12, wherein the exhaust stream has an operating oxygen content and an idling oxygen content which is greater than the operating oxygen content.

* * * * *